(12) United States Patent
Chiang (10) Patent No.: US 9,866,262 B2
(45) Date of Patent: Jan. 9, 2018

(54) WIRELESS TRANSCEIVING DEVICE

(71) Applicant: ZyXel Communications Corp., New Taipei (TW)

(72) Inventor: Lu-Wei Chiang, Hsinchu (TW)

(73) Assignee: ZyXEL communications Corp., Hsinchu (TW)

(*) Notice: Subject to any disclaimer, the term of this patent is extended or adjusted under 35 U.S.C. 154(b) by 0 days.

(21) Appl. No.: 15/149,195

(22) Filed: May 9, 2016

(65) Prior Publication Data

US 2017/0099075 A1    Apr. 6, 2017

Related U.S. Application Data

(60) Provisional application No. 62/236,987, filed on Oct. 5, 2015.

(30) Foreign Application Priority Data

Jan. 27, 2016    (TW) .............................. 105102461 A (51) Int. Cl.
*H04B 1/44* (2006.01)
*H04B 7/04* (2017.01)
*H04B 7/08* (2006.01)

(52) U.S. Cl.
CPC ................ *H04B 1/44* (2013.01); *H04B 7/04* (2013.01); *H04B 7/0825* (2013.01); *H04B 7/0877* (2013.01)

(58) Field of Classification Search
CPC . H04B 1/44; H04B 1/48; H04B 1/525; H04B 1/406; H04B 1/18; H04B 7/04; H04B 7/0825; H04B 7/0877
USPC .............................. 455/75, 76, 77, 78, 550.1
See application file for complete search history.

(56) References Cited

U.S. PATENT DOCUMENTS

| | | | |
|---|---|---|---|
| 6,600,901 B1 * | 7/2003 | Koehne ................... | H01Q 1/245 343/724 |
| 8,872,706 B2 * | 10/2014 | Caballero ............... | H01Q 1/243 343/702 |
| 2007/0197170 A1 * | 8/2007 | Boos ....................... | H04B 1/406 455/78 |
| 2011/0165848 A1 * | 7/2011 | Gorbachov .......... | H04B 1/0064 455/78 |
| 2012/0115553 A1 * | 5/2012 | Mahe .................... | H04B 7/0825 455/575.7 |
| 2016/0218426 A1 * | 7/2016 | Kelly ....................... | H01Q 3/24 |

* cited by examiner

*Primary Examiner* — Nhan Le
(74) *Attorney, Agent, or Firm* — Winston Hsu (57) ABSTRACT

A wireless transceiving device is proposed. The wireless transceiving device includes a transmitting circuit, a receiving circuit and an auxiliary receiving circuit. The transmitting circuit includes a signal transceiving circuit. The receiving circuit includes the signal transceiving circuit. The auxiliary receiving circuit is coupled to the receiving circuit and includes an auxiliary antenna. When the receiving circuit receives a signal via the signal transceiving circuit, the auxiliary receiving circuit assists the receiving circuit to receive the signal via the auxiliary antenna.

6 Claims, 11 Drawing Sheets

FIG. 9

WIRELESS TRANSCEIVING DEVICE

CROSS-REFERENCE TO RELATED APPLICATION

This application claims the priority benefits of U.S. provisional application Ser. No. 62/236,987, filed on Oct. 5, 2015 and Taiwan application Ser. No. 105102461, filed on Jan. 27, 2016. The entirety of each of the above-mentioned patent applications is hereby incorporated by reference herein and made a part of this specification.

BACKGROUND OF THE INVENTION

Field of the Invention

The invention relates to a wireless transceiving device.

Description of Related Art

In present Wi-Fi product design, access point (AP) generally has superior radio frequency (RF) transmitting power and receiving sensitivity. However, since wireless user devices (for example, a mobile phone, a tablet personal computer (PC), a notebook, etc.) should lower the RF power to increase battery durability, most of the wireless user devices adopt a low RF transmitting power design. Moreover, in order to avoid radiation damage caused by the wireless user devices, the wireless user devices are further required to satisfy a specific absorption rate (SAR) regulation, thus the wireless user devices cannot transmit stronger RF power.

Namely, under a general usage situation, although the wireless user device can receive a Wi-Fi signal coming from the AP, the wireless user device might fail to transmit the wireless signal to the AP due to the low RF transmitting power design. Therefore, the wireless user device probably cannot successfully access the wireless network due to unstable connection with the AP. Moreover, the aforementioned situation can be more worse in a multi-path and multiple-barriers environment.

Prior art methods tend to use more antennas and multi-input multi-output (MIMO) system in the AP to solve the aforementioned problems. However, such method results in higher cost and a more complicated circuit design, as a result, the price of a high-end product cannot be afforded by a general consumer.

Minimum detectable signal (hereinafter MDS) is a specific value of minimum receivable power, furthermore, it is defined as the equivalent noise power presenting on the input to a receiver that sets the limit on the smallest signal the receiver can detect. In order to overcome MDS limitation/receiver sensitivity, some well-known technologies have been implemented, such as MRC (maximum ratio combining), STBC (space-time block coding), LDPC (low-density parity-check code), etc.

Figure 1:
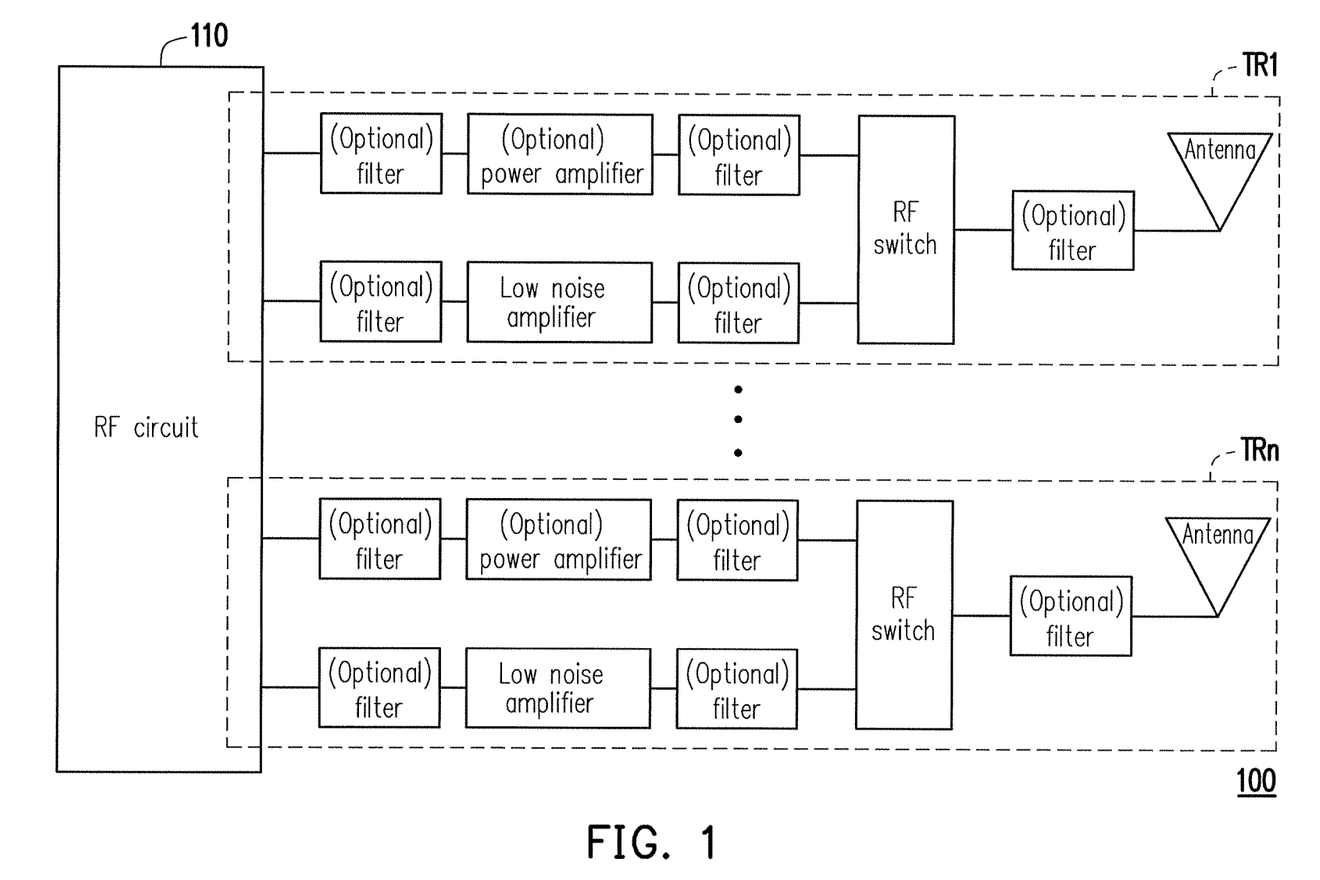
FIG. 1 is a structural diagram of a commonly used AP in the conventional technique.

FIG. 1 is a structural diagram of a conventional AP. In FIG. 1, the AP 100 includes a RF circuit (which is also referred to as a RF circuit 110, for example, a RF integrated circuit (RFIC), though the invention is not limited thereto) and n sets (n is a positive integer) of transceiving combinations TR1-TRn. As illustrated in FIG. 1, the signal to noise ratio (SNR) can be obtained according to the proportion of the RF signal power and the noise power (for example, thermal noise power of printed circuit board and assemble (PCBA)), so as a current minimum detectable signal (MDS) is determined.

Figure 2:
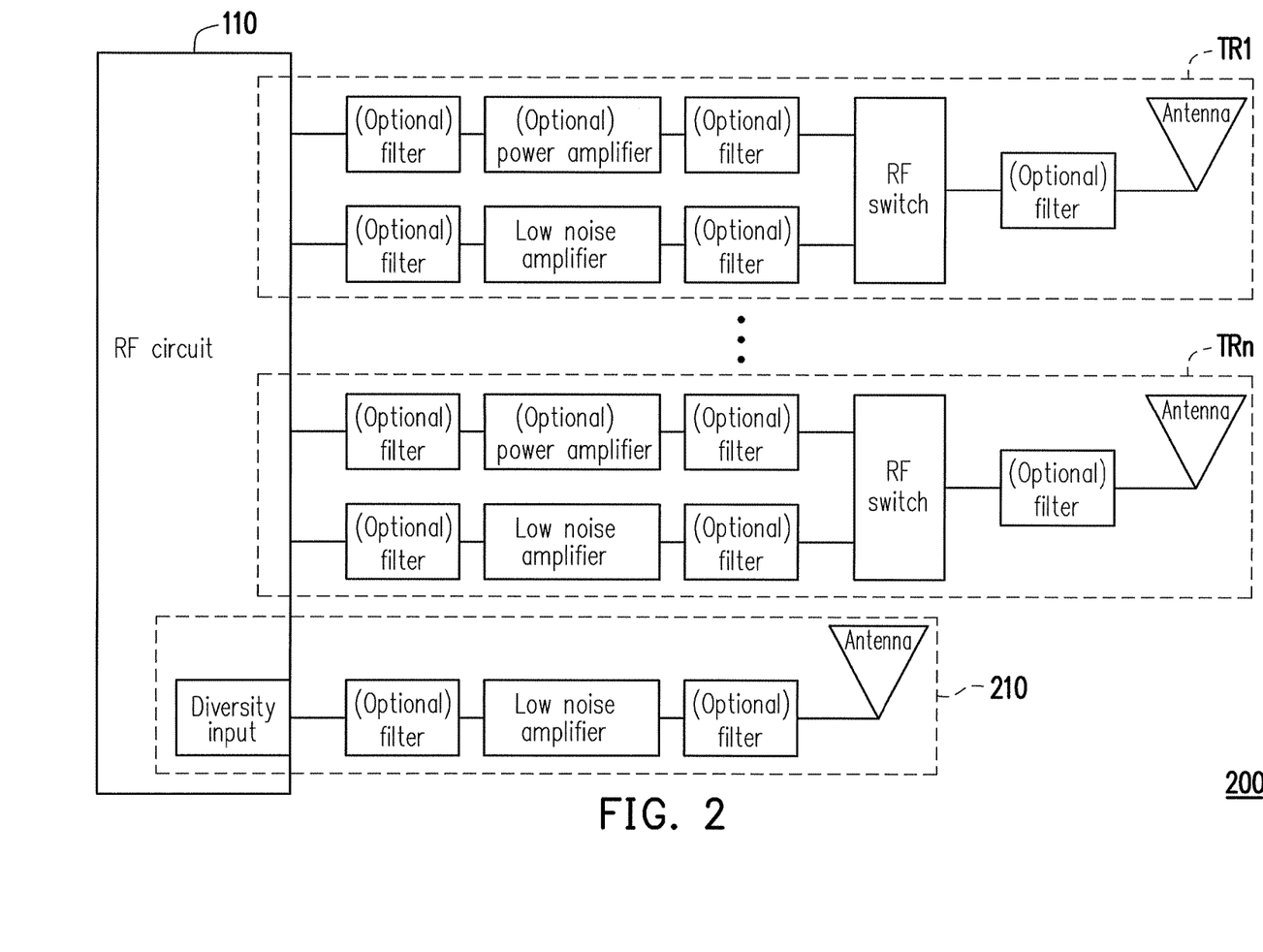
FIG. 2 illustrates an AP structure including a diversity path in the current technique.

In order to improve a receiving capability, an AP in FIG. 2 is further proposed to provide a better SNR. FIG. 2 illustrates an AP with an antenna diversity design. Compared to FIG. 1, the AP 200 of FIG. 2 can be equivalent to the AP 100 which adds a diversity path 210. In order to support the functions in FIG. 2, RFIC chip supplier needs to design additional control software corresponding to the added diversity path 210. Although adding one more receiving path in the AP 200, the diversity path 210 is merely used to replace the receiver with poorer receiving performance in the transceiving combinations TR1-TRn during the operation of the AP 200, the receiving performance of the AP 200 is not greatly improved while compared to AP 100.

Moreover, a high gain antenna in various transceiving combinations TR1-TRn is also commonly used for increasing the receiving performance of the AP 100. The high gain antenna is a directional antenna with a focused, narrow radio wave beam width, and is commonly used in a base station. However, since a transmitter and a receiver in each of the transceiving combinations TR1-TRn share the same antenna, the antenna of the transmitter is limited by related regulations (for example, a federal communications commission (FCC) certification and a CE certification), therefore it is not suitable for an indoor AP with the high gain directional antenna. Moreover, an average gain or efficiency of the high gain directional antenna is only about 80%. Therefore, using the high gain antenna in each of the transceiving combinations TR1-TRn cannot effectively improve the receiving performance of the AP 100.

Furthermore, the gain of the antenna can be enhanced by implementing a beamforming technique on the antenna. Beamforming can be used at both the transmitting and receiving ends in order to achieve spatial selectivity. However, since the AP cannot be directional during the receiving operation, the AP can only use the transmit beamforming. Moreover, the beamforming technique requires the RFIC chip supplier's help to design the corresponding algorithm. In addition, while using the beamforming technique, it is assumed that the RF signal has to be received first, i.e. when the AP failed to receive the RF signal from the wireless user devices due to an excessively long distance, etc., the beamforming technique cannot work. Also in this case, the MDS limitation still exists.

Most of the RFIC chip suppliers adopt a maximum ratio combining (MRC) mechanism to improve the receiving performance of the AP with MIMO structure. However, the maximum gain that can be reached by the MRC mechanism is limited by the number of the receiving paths. For example, the maximum gain that can be reached by three receiving paths is 3 times, i.e. 4.7 dB. Besides, all the above techniques rely on the support from the RFIC chip supplier, manufacturing cost of the RFICs is rather higher.

Therefore, it is an important issue for related technicians how to break the MDS limitation and to improve the AP receiving performance without increasing the manufacturing cost, such that the wireless user device may have prolonged battery durability based on a lower RF transmitting power.

SUMMARY OF THE INVENTION

The invention includes a wireless transceiving device configured with an auxiliary receiving circuit, which is able to break the MDS limitation to improve receiving performance of the wireless transceiving device without increasing the manufacturing cost.

The invention also provides a wireless transceiving device including a transmitting circuit, a receiving circuit and at least one auxiliary receiving circuit. The transmitting circuit includes a signal transceiving circuit. The receiving circuit includes the signal transceiving circuit. The at least one auxiliary receiving circuit is coupled to the receiving circuit and each one includes an auxiliary antenna. When the receiving circuit receives a signal through the signal transceiving circuit, the at least one auxiliary receiving circuit assists the receiving circuit to receive the signal through the auxiliary antenna.

In an embodiment of the invention, the signal transceiving circuit includes a first antenna and a second antenna, the transmitting circuit transmits a first signal through the first antenna, and the receiving circuit receives a second signal through the second antenna. When the receiving circuit receives the second signal through the second antenna, the at least one auxiliary receiving circuit assists the receiving circuit to receive the second signal through the auxiliary antenna.

In an embodiment of the invention, the signal transceiving circuit includes a radio frequency (RF) switch and an antenna, the RF switch couples the antenna to the receiving circuit and the transmitting circuit, the RF switch switches to facilitate the transmitting circuit to transmit a first signal through the antenna, or switches to facilitate the receiving circuit to receive a second signal through the antenna. When the RF switch switches to facilitate the receiving circuit to receive the second signal through the antenna, the at least one auxiliary receiving circuit assists the receiving circuit to receive the second signal through the auxiliary antenna.

In an embodiment of the invention, the wireless transceiving device further includes a RF circuit, which is coupled to the transmitting circuit and the receiving circuit. A first terminal of the RF switch is coupled to the antenna, and a second terminal of the RF switch is coupled to a transmitting node of the RF circuit. The receiving circuit further includes a first low noise amplifier (LNA) and a signal addition circuit. An input terminal of the first low noise amplifier is coupled to a third terminal of the RF switch. The signal addition circuit is coupled between the RF circuit and an output terminal of the first low noise amplifier.

In an embodiment of the invention, the at least one auxiliary receiving circuit includes a second low noise amplifier. An input terminal of the second low noise amplifier is coupled to the auxiliary antenna, and an output terminal of the second low noise amplifier is coupled to the signal addition circuit. The second low noise amplifier is used to electrically isolate the auxiliary antenna from the antenna and other auxiliary antennas.

In an embodiment of the invention, the receiving circuit further includes a filter, which is coupled between the output terminal of the first low noise amplifier and a receiving node of the RF circuit.

In an embodiment of the invention, the auxiliary antenna of the at least one auxiliary receiving circuit is a directional antenna. If the number of the at least one auxiliary receiving circuit is larger than one, the auxiliary antennas point to different directions.

In an embodiment of the invention, the antenna has an antenna pattern, and an auxiliary antenna has an auxiliary antenna pattern as well, the antenna pattern and the auxiliary antenna are synthesized into an omni-directional antenna pattern.

According to the above descriptions, the wireless transceiving device of the invention may be configured with an additional auxiliary receiving circuit to assist the receiving circuit to receive the signal coming from a wireless user device in a receiving mode.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3A:
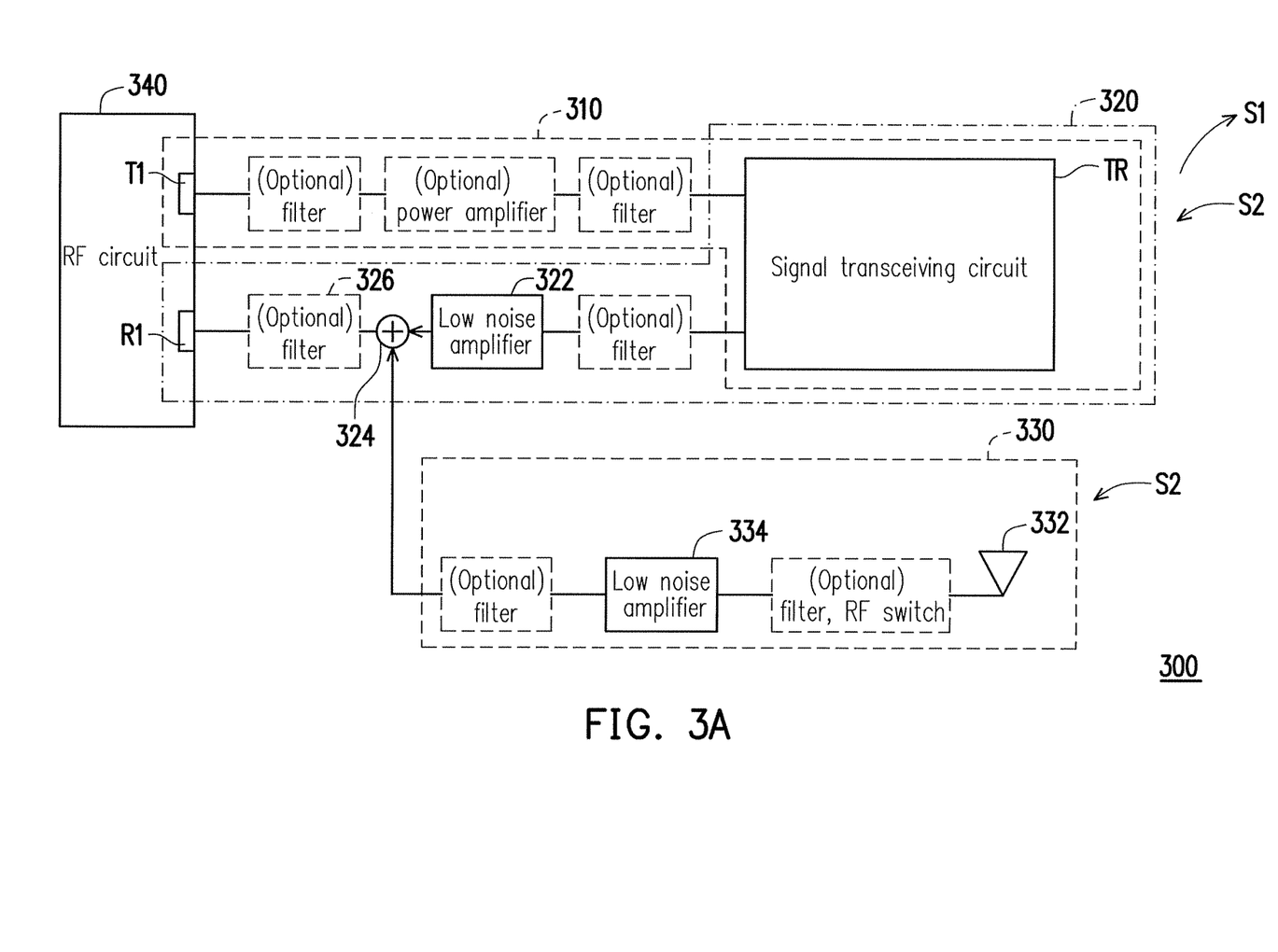
FIG. 3A is a schematic diagram of a wireless transceiving device according to an embodiment of the invention.

FIG. 3A is a schematic diagram of a wireless transceiving device according to an embodiment of the invention. In the present embodiment, the wireless transceiving device 300 can be an access point (AP), a router, a switch or other similar network device. Moreover, in other embodiments, the wireless transceiving device 300 can also be a base station operated under a communication technical standard, such as Global System for Mobile Cmmunications (GSM), $3^{rd}$ Generation Partnership Project Long Term Evolution (3GPP LTE), Code Division Multiple Access (CDMA), Wideband Code Division Multiple Access (WCDMA), High Speed Packet Access (HSPA), and Worldwide interoperability for Microwave Access (WiMAX), etc., for example, a femtocell base station, a picocell base station or a remote radio head (RRH), etc., though the invention is not limited thereto. For simplicity's sake, it is assumed that the wireless transceiving device 300 is an AP operated under IEEE 802.11, and those skilled in the art may deduce implementations of the wireless transceiving device 300 operated under other communication technical standard according to following introductions.

The wireless transceiving device 300 includes a transmitting circuit 310, a receiving circuit 320, an auxiliary receiving circuit 330 and a radio frequency (RF) circuit 340. Both of the transmitting circuit 310 and the receiving circuit 320 include a signal transceiving circuit TR. In other embodiments, the transmitting circuit 310, the receiving circuit 320 and the auxiliary receiving circuit 330 may optionally include various filters and power amplifiers (PA), etc., as shown in FIG. 3A.

In order to improve receiving performance of the wireless transceiving device 300, in the invention, the auxiliary receiving circuit 330 coupled to the receiving circuit 320 is additionally configured in the wireless transceiving device 300. In an embodiment, when the receiving circuit 320 receives a signal through the signal transceiving circuit TR, the auxiliary receiving circuit 330 may assist the receiving circuit 320 to receive the signal through an auxiliary antenna 332, which is described in detail below.

Figure 3B:
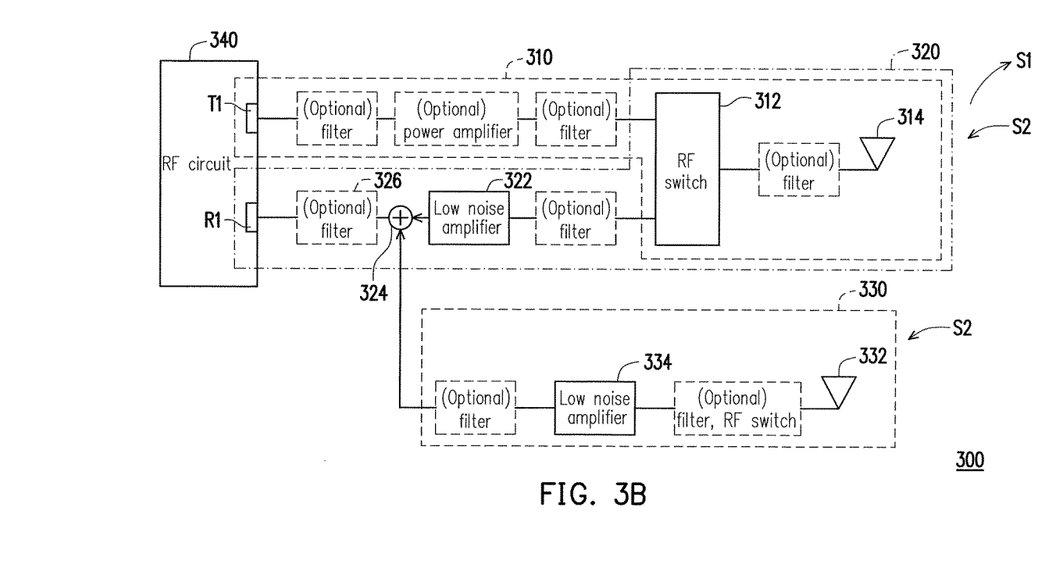
FIG. 3B is a schematic diagram of the wireless transceiving device of FIG. 3A.

FIG. 3B is a schematic diagram of the wireless transceiving device of FIG. 3A. In the present embodiment, the signal transceiving circuit TR includes a RF switch 312 and an antenna 314. The receiving circuit 320 also includes the RF switch 312 and the antenna 314, i.e. the RF switch 312 couples the antenna 314 to the receiving circuit 320 and the transmitting circuit 310. In the present embodiment, a first terminal of the RF switch 312 is coupled to the antenna 314, a second terminal of the RF switch 312 is coupled to a transmitting node T1 of the RF circuit 340, and a third terminal of the RF switch 312 is coupled to a low noise amplifier (LNA) 322. An input terminal of the LNA 322 is coupled to the third terminal of the RF switch 312, and an output terminal thereof can be coupled to a signal addition circuit 324. The signal addition circuit 324 is coupled to a receiving node R1 of the RF circuit 340. Since the wireless transceiving device 300 includes one transmitting circuit and two receiving circuits, the wireless transceiving device 300 can be referred to as a 1-transmitting and 2-receiving (1T2R) structure.

In an embodiment, when the wireless transceiving device 300 is in a transmitting mode, the RF switch 312 may switch to facilitate the transmitting circuit 310 to transmit a first signal S1 through the antenna 314. The first signal S1 is, for example, a wireless signal to be transmitted to a wireless user device by the wireless transceiving device 300, for example, a Wi-Fi signal, etc., though the invention is not limited thereto. On the other hand, when the wireless transceiving device 300 is in a receiving mode, the RF switch 312 may switch to facilitate the receiving circuit 320 to receive a second signal S2 through the antenna 314. The second signal S2 is, for example, a signal coming from the wireless user device. As described above, in order to prolong the battery durability of the wireless user device and satisfy a specific absorption rate (SAR) limitation, the wireless user device cannot use a stronger RF power, for example, the wireless user device only uses a transmitting power of 5 dBm to transmit the second signal S2. When the antenna 314 receives the second signal S2 through an obstacle (for example, a wall) or a poor wireless channel, the receiving power of the second signal S2 is rather low, for example, −85 dBm.

Therefore, in the invention, the wireless transceiving device 300 is additionally configured with the auxiliary receiving circuit 330 coupled to the receiving circuit 320 for improving the receiving performance of the wireless transceiving device 300. In an embodiment, when an output terminal of the LNA 322 is coupled to the receiving node R1 of the RF circuit 340 through the signal addition circuit 324, the auxiliary receiving circuit 330 is also coupled to the receiving node R1 of the RF circuit 340 through the signal addition circuit 324. In another embodiment, when the LNA 322 is coupled to the receiving node R1 of the RF circuit 340 through the signal addition circuit 324 and a certain filter (for example, a filter 326), the auxiliary receiving circuit 330 is also coupled to the RF circuit 340 through the signal addition circuit 324 and the filter 326, as shown in FIG. 3B. In an embodiment, the filter 326 can be implemented by a matching filer or other types of filters according to a requirement of a designer.

In the present embodiment, the auxiliary receiving circuit 330 includes the auxiliary antenna 332, which may assist the receiving circuit 320 to receive the second signal S2 when the RF switch 312 switches to facilitate the receiving circuit 320 to receive the second signal S2 through the antenna 314. In this case, since the receiving node R1 of the RF circuit 340 simultaneously receives the second signal S2 from the antenna 314 and the auxiliary antenna 332, and superimposes together through the signal addition circuit 324, a signal to noise ratio (SNR) obtained by the receiving node R1 is increased. In other words, even if the wireless user device still transmits the second signal S2 through the transmitting power of 5 dBm, the wireless transceiving device 300 configured with the auxiliary receiving circuit 330 may achieve a higher signal receiving power (for example, twice of −85 dBm), so as to improve a data throughput. According to another aspect, the wireless user device may use a weaker RF power for transmitting the second signal S2, for example, the wireless user device may use a transmitting power of a half of 5 dBm to reach the original data throughput, which is measured when the wireless transceiving device 300 is not configured with the auxiliary receiving circuit 330. In this case, the batter durability of the wireless user device can be further enhanced.

For example, in an embodiment of the invention, one set of the auxiliary antenna 332 (which may have a same specification with that of the antenna 314) is added, the measured SNR value is close to twice of the SNR value measured in a wireless transceiveing device without the auxiliary antenna 332. Therefore, the minimum detectable signal (MDS) limitation is indirectly broken through, and the receiving performance of the wireless transceiving device 300 is enhanced. In other embodiments, a higher SNR value can be achieved by adding a plurality sets of the auxiliary antenna 332.

In another embodiment, if isolation between the antenna 314 and the auxiliary antenna 332 is enhanced (i.e. to reduce the interferences between the antenna 314 and the auxiliary antenna 332), the receiving performance of the wireless transceiving device 300 can be more effectively and conveniently analysed and evaluated. Therefore, the auxiliary receiving circuit 330 may further include a LNA 334, which is used for electrically isolating the auxiliary antenna 332 from the antenna 314. As shown in FIG. 3B, an input terminal of the LNA 334 can be coupled to the auxiliary antenna 332, and an output terminal of the LNA 334 can be coupled to the receiving node R1 of the RF circuit 340 through the signal addition circuit 324. In the embodiment that the LNA 322 of the receiving circuit 320 is coupled to the receiving node R1 through the signal addition circuit 324 and the filter 326, the LNA 334 of the auxiliary receiving circuit 330 can also be coupled to the receiving node R1 through the signal addition circuit 324 and the filter 326, though the invention is not limited thereto.

However, in some cases, the LNA 334 is probably unable to be turned off properly. For example, when the power of the first signal S1 transmitted by the antenna 314 is higher, the auxiliary antenna 332 may also receive such the high power first signal S1, the LNA 334 probably cannot be successfully turned off. Therefore, in other embodiments, the RF switch can be optionally configured between the auxiliary antenna 332 and the LNA 334 for properly turning off the LNA 334 when the LNA 334 is hard to be turned off.

In order to make the wireless transceiving device 300 receive the signal coming from the wireless user device omnidirectionally, an auxiliary antenna pattern of the auxiliary antenna 332 can be designed into a pattern suitable for synthesizing with an antenna pattern of the antenna 314 to form an omni-directional antenna pattern. For example, the auxiliary antenna 332 can be implemented by a high gain antenna, and the auxiliary antenna pattern can be designed into the aforementioned pattern through specific horizontal or vertical polarization, though the invention is not limited thereto.

Figure 3C:
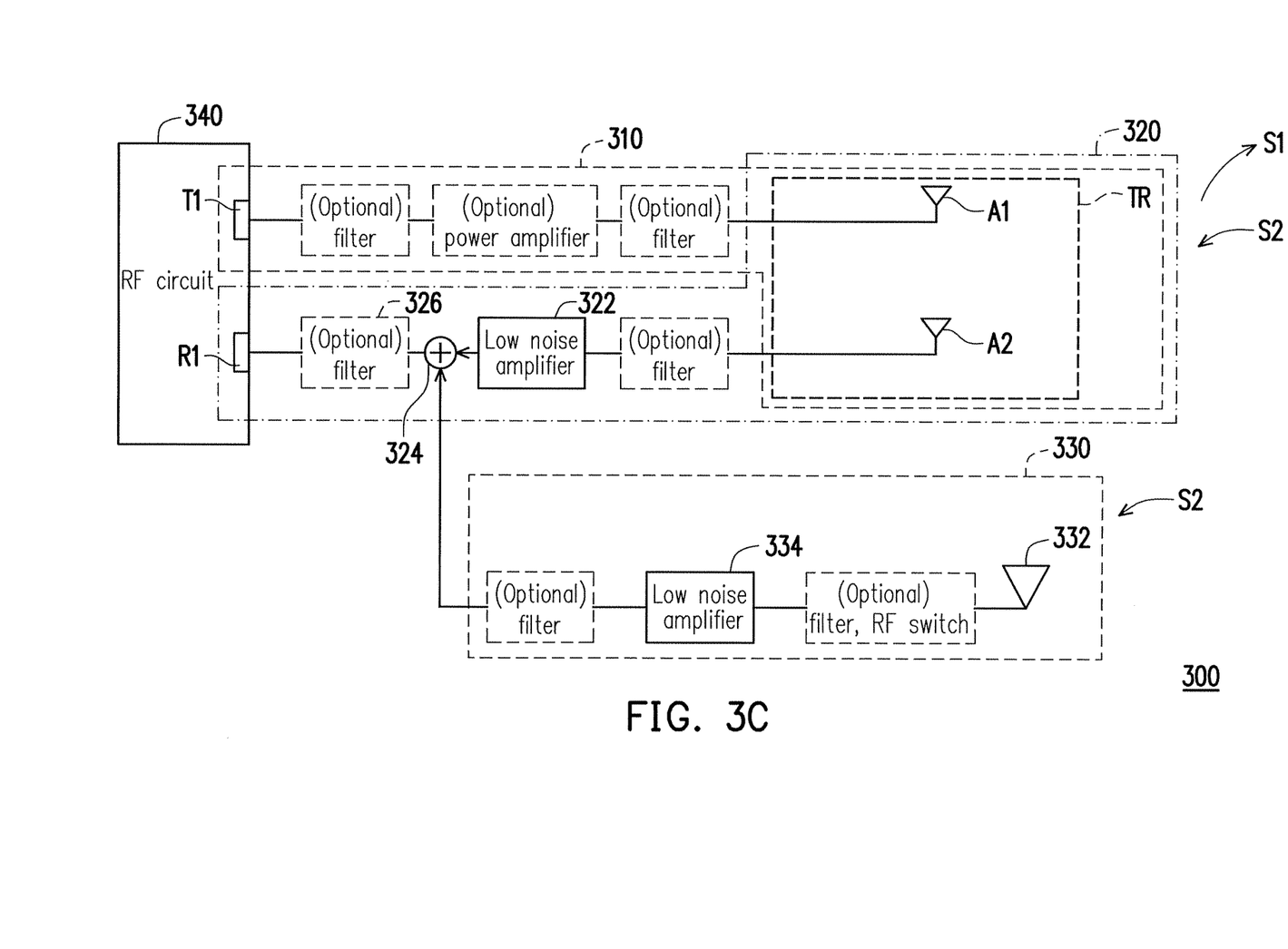
FIG. 3C is another schematic diagram of a wireless transceiving device of FIG. 3A.

FIG. 3C is another schematic diagram of a wireless transceiving device of FIG. 3A. In the present embodiment, the signal transceiving circuit TR may include a first antenna A1 and a second antenna A2 respectively configured to the transmitting circuit 310 and the receiving circuit 320. The transmitting circuit 310 may transmit the first signal S1 through the first antenna A1, and the receiving circuit 320 may receive the second signal S2 through the second antenna A2. Similar to the mechanism introduced in the aforementioned embodiment, when the receiving circuit 320 receives the second signal S2 through the second antenna A2, the auxiliary receiving circuit 330 may assist the receiving circuit 320 to receive the second signal S2 through the auxiliary antenna 332, and detailed operation method and description thereof may refer to the description of the aforementioned embodiment, which are not repeated.

Figure 4:
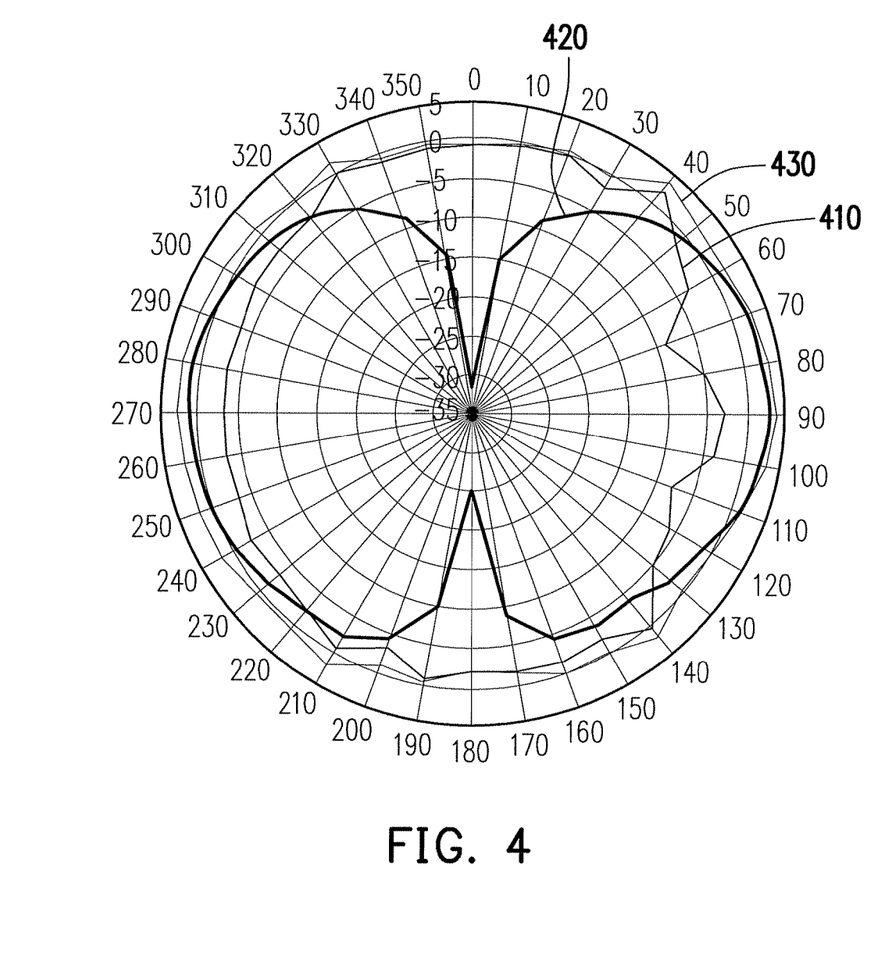
FIG. 4 is a schematic diagram of a synthesized omni-directional antenna pattern according to an embodiment of the invention.

FIG. 4 is a schematic diagram of a synthesized omni-directional antenna pattern according to an embodiment of the invention. In the present embodiment, by suitably designing an auxiliary antenna pattern 420 of the auxiliary antenna 332, the auxiliary antenna pattern 420 can be synthesized with an antenna pattern 410 of the antenna 314 to form an omni-directional antenna pattern 430. In this way, the wireless transceiving device 300 may receive the signal coming from the wireless user device omnidirectionally, so as to ameliorate the receiving performance of the wireless transceiving device 300.

Figure 5:
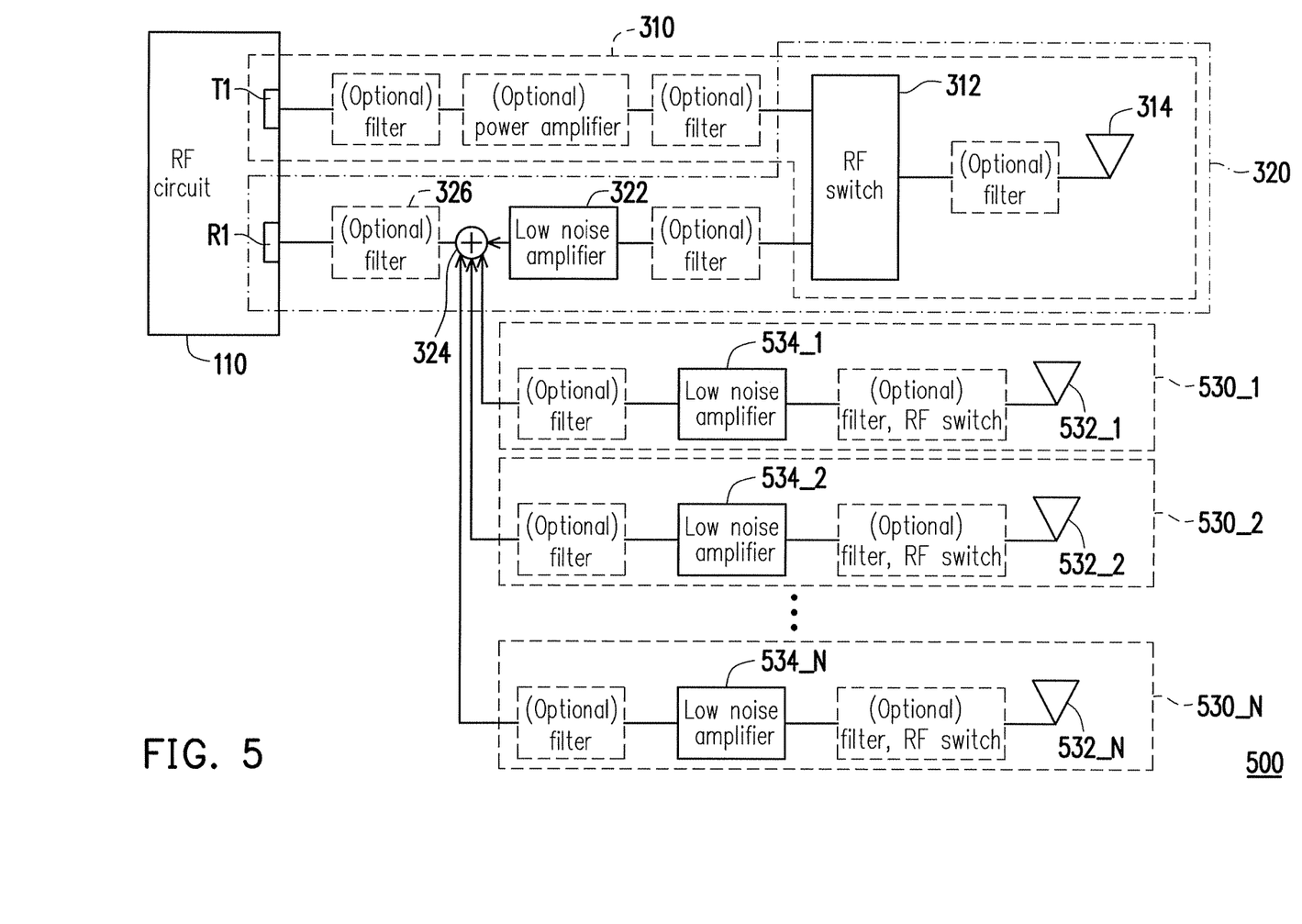
FIG. 5 is a schematic diagram of a wireless transceiving device according to the embodiment of FIG. 3B.

In other embodiments, the wireless transceiving device can also be designed to include a plurality sets of the auxiliary receiving circuit, as shown in FIG. 5. FIG. 5 is a schematic diagram of a wireless transceiving device according to the embodiment of FIG. 3B. In the present embodiment, the wireless transceiving device 500 may include the transmitting circuit 310, the receiving circuit 320, auxiliary receiving circuits 530_1-530_N (where N is a positive integer) and the RF circuit 340. As described above, in order to electrically isolate auxiliary antennas 532_1-532_N from each other, the auxiliary receiving circuits 530_1-530_N can be configured with respective LNAs 534_1-534_N. Moreover, in order to make the wireless transceiving device 500 to receive the signal coming from the wireless user device omni-directionally, each of the auxiliary antennas 532_1-532_N can be implement as directional antennas pointing in different directions. Moreover, the auxiliary antenna pattern of each of the auxiliary antennas 532_1-532_N can be designed into a pattern suitable for synthesizing with the antenna pattern of the antenna 314 to form the omni-directional antenna pattern.

Figure 6:
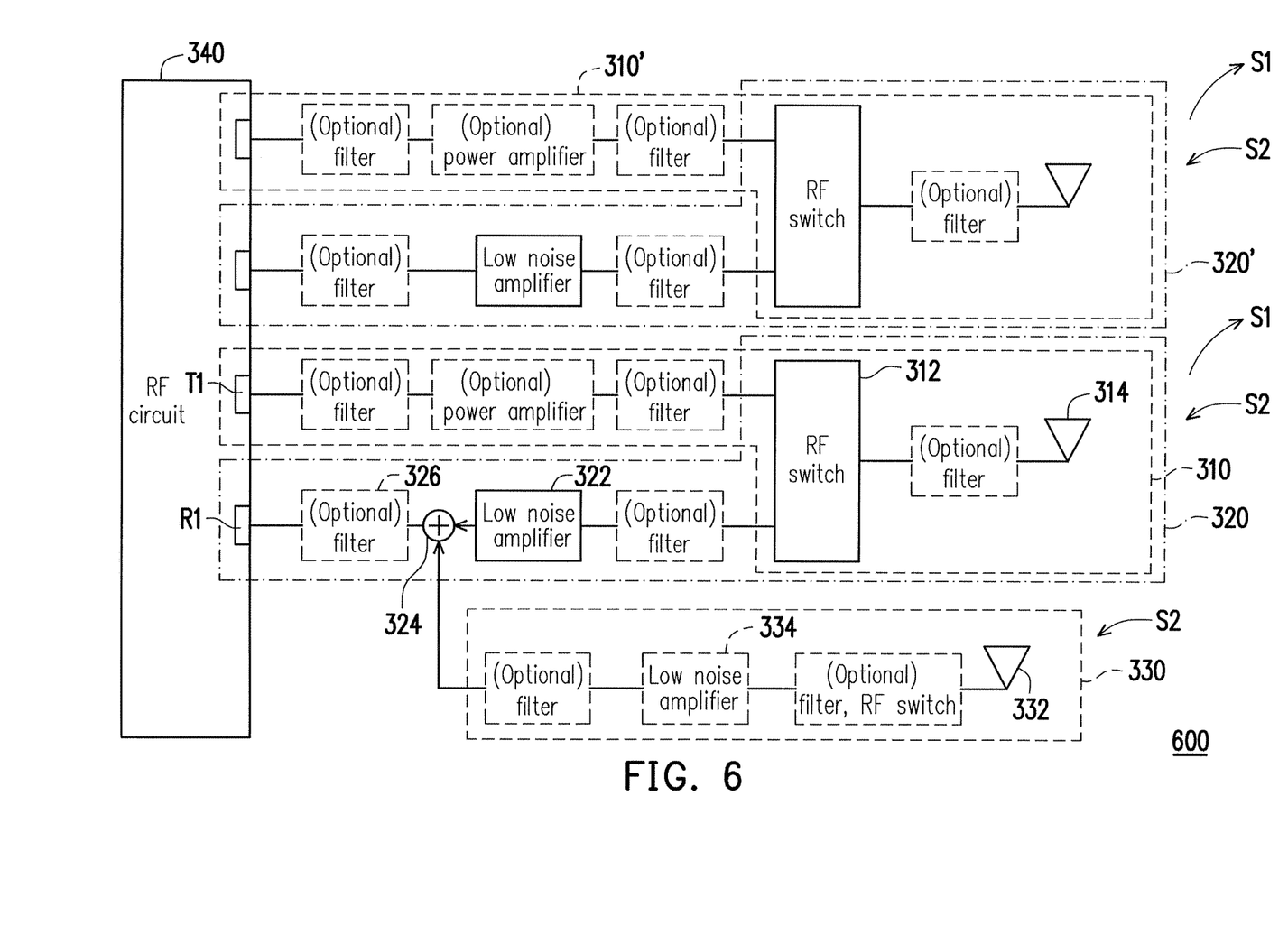
FIG. 6 is a schematic diagram of a wireless transceiving device according to the embodiment of FIG. 3B.
Figure 7:
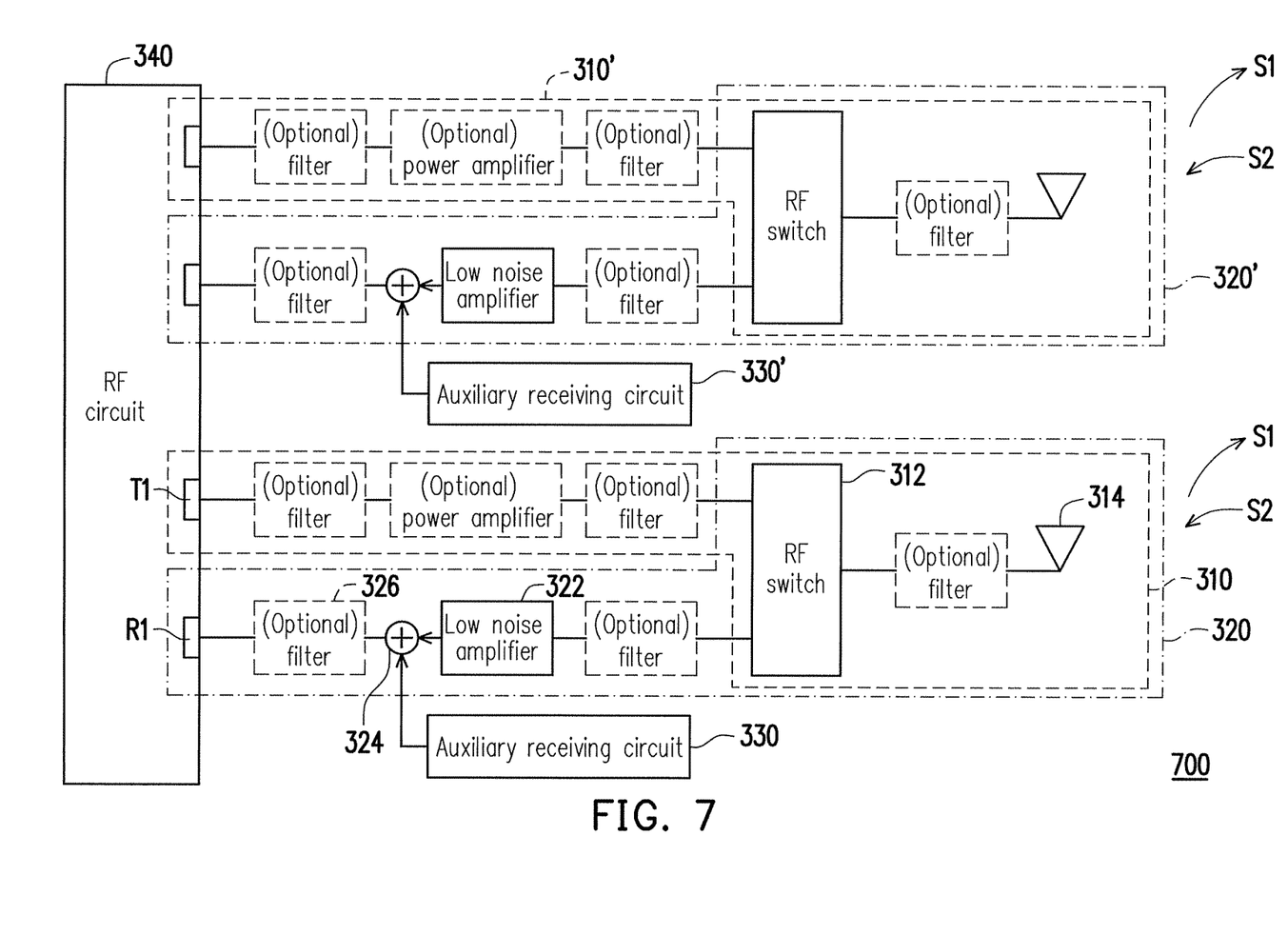
FIG. 7 is a schematic diagram of a wireless transceiving device according to the embodiment of FIG. 6.

In other embodiments, the wireless transceiving device can be designed to include a plurality of transmitting circuits, a plurality of receiving circuits and a plurality of auxiliary receiving circuits, as shown in FIG. 6 and FIG. 7. Referring to FIG. 6, FIG. 6 is a schematic diagram of a wireless transceiving device according to the embodiment of FIG. 3B. In the present embodiment, besides that the wireless transceiving device 600 includes all of the components shown in FIG. 3B, the wireless transceiving device 600 further includes a transmitting circuit 310' and a receiving circuit 320', and a circuit structure and an operation method thereof may refer to related description of the embodiments of FIG. 1 and FIG. 2, which are not repeated. Since the wireless transceiving device 600 includes two transmitting circuits and three receiving circuits, the wireless transceiving device 600 can be referred to as a 2-transitting and 3-receiving (2T3R) structure.

Referring to FIG. 7, FIG. 7 is a schematic diagram of a wireless transceiving device according to the embodiment of FIG. 6. In the present embodiment, besides that the wireless transceiving device 700 includes all of the components shown in FIG. 6, the wireless transceiving device 700 further includes an auxiliary receiving circuit 330' coupled to the receiving circuit 320', and a circuit structure and an operation method thereof may refer to related description of the auxiliary receiving circuit 330 of the aforementioned embodiment, which are not repeated. Since the wireless transceiving device 700 includes two transmitting circuits and four receiving circuits, the wireless transceiving device 700 can be referred to as a 2-transitting and 4-receiving (2T4R) structure.

In other embodiments, the structure of FIG. 3C can be adjusted to the wireless transceiving devices shown in FIG. 5-FIG. 7 according to an actual requirement, though the invention is not limited thereto.

Figure 8:
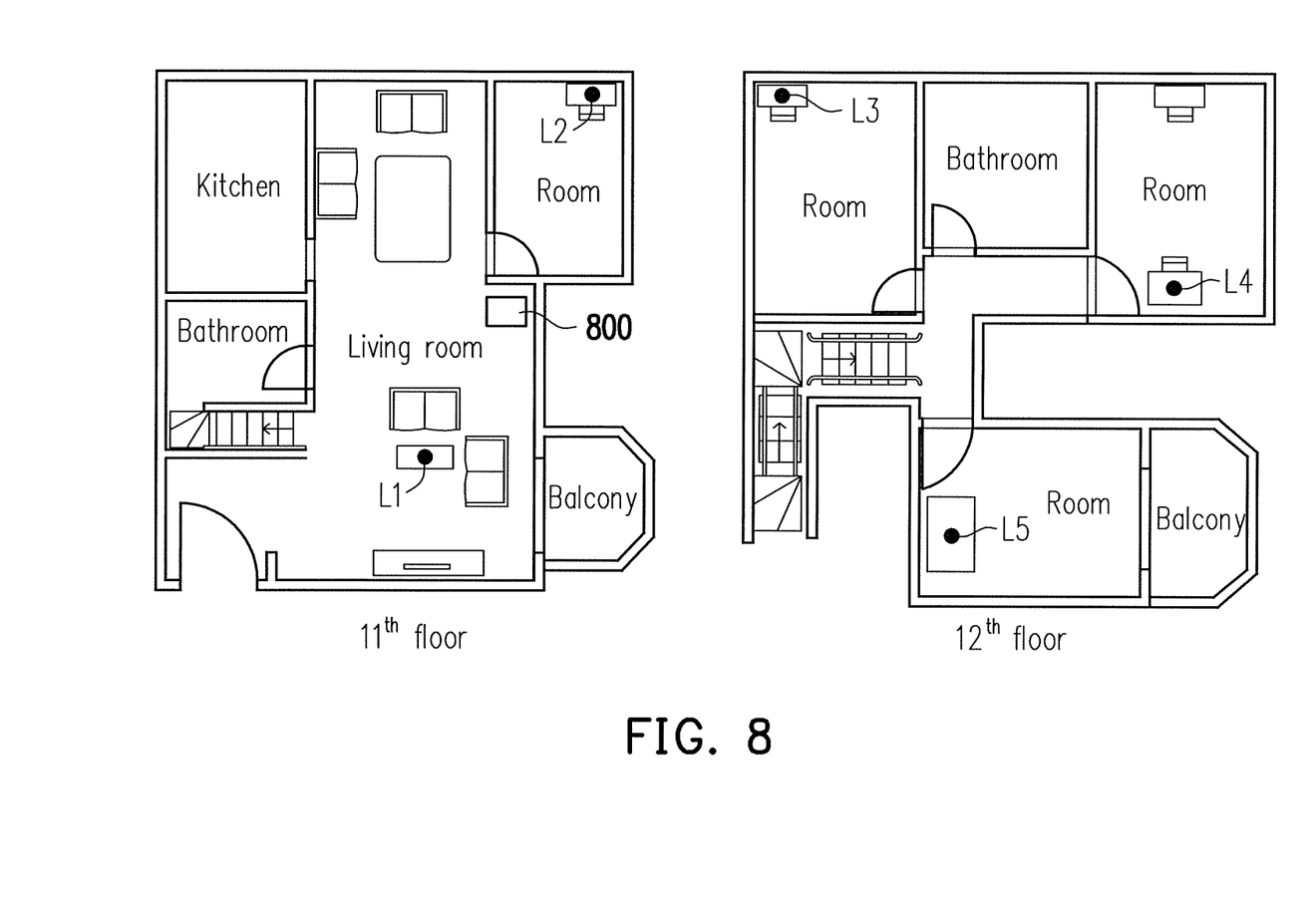
FIG. 8 is a floor plan of a demonstration site according to an embodiment of the invention.

Referring to FIG. 8, FIG. 8 is floor plan of a demonstration site according to an embodiment of the invention. In the present embodiment, four different types of the wireless transceiving devices are respectively placed at a location 800 of FIG. 8. The receiving performances of the wireless transceiving devices are measured by using the wireless user devices located at locations L1-L5. The aforementioned four types of APs are, for example, the AP 100 of FIG. 1 (where n is 2), the wireless transceiving device 700 of FIG. 7 (2T4R), an AP of a manufacturer A (2T2R) and an AP of a manufacturer B (2T2R).

Figure 9:
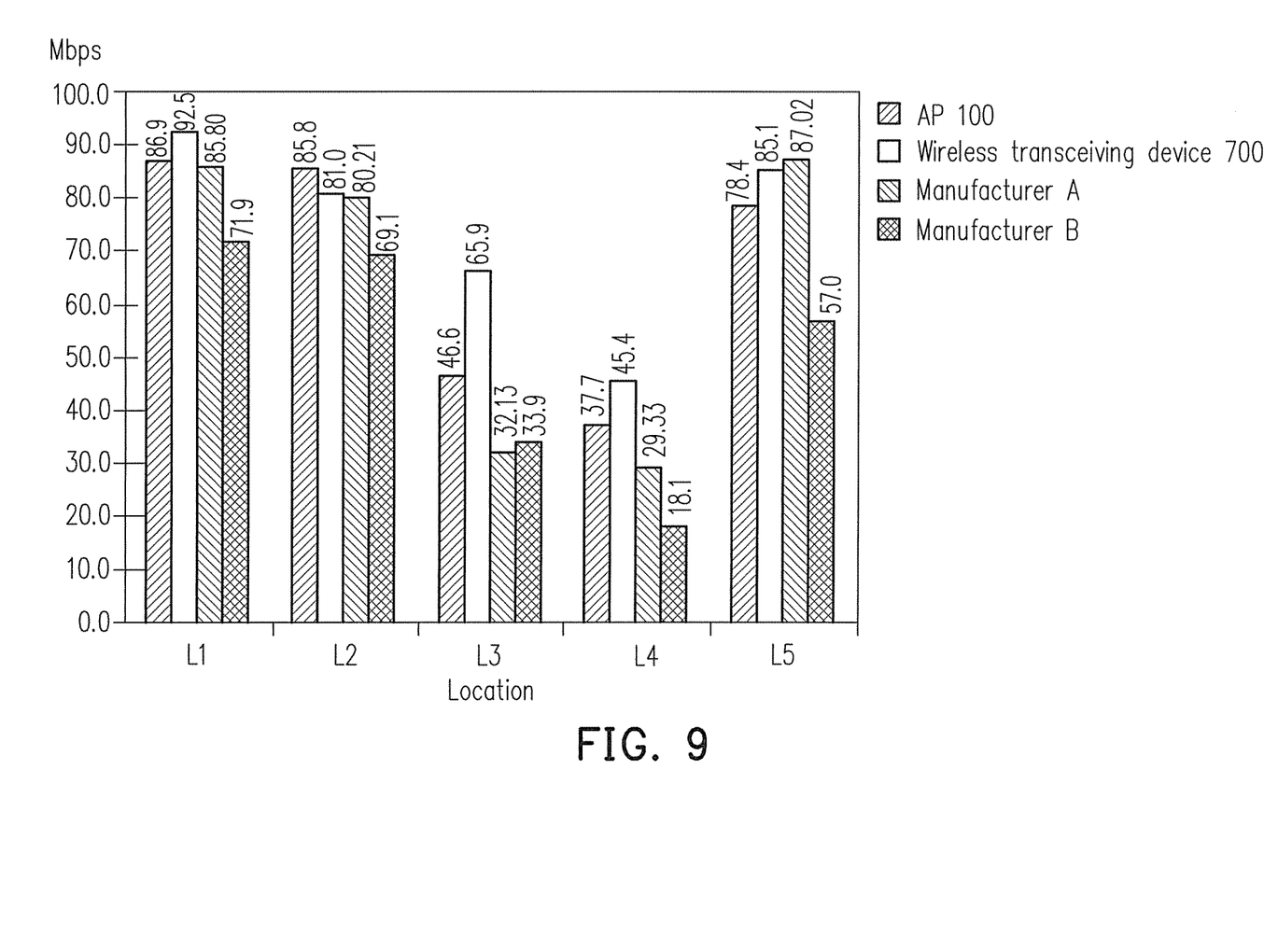
FIG. 9 is a schematic diagram illustrating receiving performances according to the embodiment of FIG. 8.

Referring to FIG. 9, FIG. 9 is a schematic diagram illustrating the receiving performances according to the embodiment of FIG. 8. According to FIG. 9, it is known that the wireless transceiving device 700 of the invention has good receiving performances for each of the locations, and especially for the locations L3 (at the corner of the upper floor) and L4 (right above), the receiving performance of the wireless transceiving device 700 is superior than that of the other three wireless transceiving devices.

In summary, the wireless transceiving device of the invention may assist the receiving circuit to receive the signal coming from the wireless user device in the receiving mode through the additionally configured auxiliary receiving circuit. In this case, since the wireless transceiving device may obtain higher SNR in the receiving mode, it may break the MDS limitation to achieve the effect of improving the receiving performance. In this way, the wireless transceiving device of the invention may increase the data throughput and/or the battery durability thereof without increasing the manufacturing cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless transceiving device, comprising:
a transmitting circuit comprising a radio frequency switch and an antenna;
a receiving circuit comprising the radio frequency switch and the antenna, wherein the radio frequency switch switches to facilitate the transmitting circuit to transmit a first signal through the antenna, or switches to facilitate the receiving circuit to receive a second signal through the antenna;
at least one auxiliary receiving circuit coupled to the receiving circuit and comprising a respective auxiliary antenna, wherein the at least one auxiliary receiving circuit assists the receiving circuit to receive the second signal through the auxiliary antenna; and
a radio frequency circuit coupled to the transmitting circuit and the receiving circuit, wherein a first terminal of the radio frequency switch is coupled to the antenna, a second terminal of the radio frequency switch is coupled to a transmitting node of the radio frequency circuit,
wherein the receiving circuit further comprises:
   a first low noise amplifier, having an input terminal coupled to a third terminal of the radio frequency switch; and
   a signal addition circuit, coupled between the radio frequency circuit, the signal transceiving circuit, and the at least one auxiliary receiving circuit, and configured to superimpose signals received from the signal transceiving circuit and the at least one auxiliary receiving circuit,
   wherein each of the at least one auxiliary receiving circuit comprises a second low noise amplifier, and the second low noise amplifier is coupled to the signal addition circuit.

2. The wireless transceiving device as claimed in claim 1, wherein the second low noise amplifier is for electrically isolating the auxiliary antenna from the antenna and other auxiliary antennas, wherein an input terminal of the second low noise amplifier is coupled to the auxiliary antenna, and an output terminal of the second low noise amplifier is coupled to the signal addition circuit.

3. The wireless transceiving device as claimed in claim 1, wherein the receiving circuit further comprises at least one filter.

4. The wireless transceiving device as claimed in claim 1, wherein the at least one auxiliary receiving circuit comprises at least one filter.

5. The wireless transceiving device as claimed in claim 1, wherein the at least one auxiliary antenna is a directional antenna,
   wherein if the number of the at least one auxiliary antenna is larger than one, the auxiliary antennas point to different directions.

6. The wireless transceiving device as claimed in claim 1, wherein the antenna has an antenna pattern, and the at least one auxiliary antenna has an auxiliary antenna pattern, the auxiliary antenna pattern and the antenna pattern are synthesized into an omnidirectional antenna pattern.

* * * * *